US009686228B2

(12) United States Patent
Hom et al.

(10) Patent No.: US 9,686,228 B2
(45) Date of Patent: *Jun. 20, 2017

(54) INTEGRATED JUST-IN-TIME SYNCHRONIZATION

(75) Inventors: Richard V. Hom, Troy, MI (US); Eric M. Nelson, Durham, NC (US); James C. North, Virginia Beach, VA (US)

(73) Assignee: International Business Machines Corporation, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/893,453

(22) Filed: Sep. 29, 2010

(65) Prior Publication Data

US 2012/0078947 A1    Mar. 29, 2012

(51) Int. Cl.
*G06F 17/30* (2006.01)
*H04L 21/00* (2006.01)
*H04L 29/12* (2006.01)

(52) U.S. Cl.
CPC .... *H04L 61/1523* (2013.01); *G06F 17/30589* (2013.01); *H04L 29/12084* (2013.01); *H04L 29/12132* (2013.01); *H04L 61/1552* (2013.01)

(58) Field of Classification Search
USPC ........................................ 707/646, 649, 769
See application file for complete search history.

(56) References Cited

U.S. PATENT DOCUMENTS

| | | | |
|---|---|---|---|
| 6,173,311 B1 * | 1/2001 | Hassett et al. | 709/202 |
| 6,523,027 B1 | 2/2003 | Underwood | |
| 6,615,253 B1 | 9/2003 | Bowman-Amuah | |
| 6,901,410 B2 | 5/2005 | Marron et al. | |
| 7,698,323 B1 | 4/2010 | Rangan et al. | |
| 7,840,588 B2 * | 11/2010 | Bell et al. | 707/769 |
| 8,249,885 B2 | 8/2012 | Berkowitz et al. | |
| 8,364,655 B2 | 1/2013 | Hom et al. | |
| 9,219,706 B2 | 12/2015 | Hom et al. | |

(Continued)

OTHER PUBLICATIONS

Krishnan, U.S. Appl. No. 12/893,437, Office Action dated Dec. 3, 2012, 21 pages.

(Continued)

*Primary Examiner* — William Spieler
(74) *Attorney, Agent, or Firm* — John R. Pivnichny; Madeline F. Schiesser; Keohane & D'Alessandro PLLC

(57) ABSTRACT

The invention is directed to just-in-time (JIT) retrieval of directory information to reduce network traffic and load on directory servers and/or data sources by requesting only the information that is currently needed from the directory server. In the invention, a request handler operating with the directory server provides this capability. Specifically, the request handler and directory server are configured to receive a request for directory information from a client and to determine a location corresponding to a set of current attribute values for responding to the request. The request handler retrieves the set of current attribute values from at least one of the following: the directory server and an external source. A set of current attributes is returned to the client from the directory server. The request handler propagates information in a JIT manner so that only the information that will be currently used by the client is propagated across the network.

22 Claims, 6 Drawing Sheets

(56) References Cited

U.S. PATENT DOCUMENTS

| | | |
|---|---|---|
| 2003/0093583 A1 | 5/2003 | Doran et al. |
| 2005/0044103 A1* | 2/2005 | MacLeod et al. ............ 707/102 |
| 2006/0080352 A1 | 4/2006 | Boubez et al. |
| 2006/0179140 A1 | 8/2006 | John et al. |
| 2008/0040395 A1* | 2/2008 | Danoyan ....................... 707/200 |
| 2008/0040550 A1 | 2/2008 | Lindner |
| 2008/0126309 A1 | 5/2008 | Rowley |
| 2008/0133712 A1 | 6/2008 | Friedman et al. |
| 2008/0209040 A1 | 8/2008 | Rathi |
| 2009/0049200 A1 | 2/2009 | Lin et al. |
| 2009/0063417 A1 | 3/2009 | Kinder |
| 2009/0183246 A1 | 7/2009 | Kokologiannakis |
| 2009/0276483 A1 | 11/2009 | Lind et al. |
| 2010/0234022 A1 | 9/2010 | Winterbottom |
| 2011/0026486 A1 | 2/2011 | Hapsari et al. |
| 2011/0264865 A1 | 10/2011 | Mobarak et al. |
| 2012/0078862 A1 | 3/2012 | Hom et al. |
| 2012/0079077 A1 | 3/2012 | Hom et al. |

OTHER PUBLICATIONS

Krishnan, U.S. Appl. No. 12/893,437, Final Office Action dated May 10, 2013, 26 pages.

Krishnan, U.S. Appl. No. 12/893,437, Office Action dated Sep. 26, 2013, 28 pages.

Krishnan, U.S. Appl. No. 12/893,437, Final Office Action dated Apr. 14, 2014, 26 pages.

Krishnan, U.S. Appl. No. 12/893,437, Office Action dated Sep. 26, 2014, 15 pages.

Krishnan, U.S. Appl. No. 12/893,437, Final Office Action dated Jan. 23, 2015, 12 pages.

Pandya, U.S. Appl. No. 12/893,468, Office Action dated May 3, 2012, 30 pages.

Pandya, U.S. Appl. No. 12/893,468, Notice of Allowance dated Sep. 27, 2012, 17 pages.

Krishnan, U.S. Appl. No. 12/893,437, Notice of Allowance dated Aug. 12, 2015, 17 pages.

* cited by examiner

INTEGRATED JUST-IN-TIME SYNCHRONIZATION

This invention was made with Government support under contract No. USJFCOM CRADA #07-10 awarded by the U.S. Department of Defense (DOD). The Government has certain rights in this invention.

CROSS-REFERENCE TO RELATED APPLICATIONS

This application is related in some aspects to the commonly owned and co-pending application Ser. No. 12/893,437 entitled "JUST-IN-TIME WRAPPER SYNCHRONIZATION," filed Sep. 29, 2010, and commonly owned and co-pending application Ser. No. 12/893,468 entitled "HYBRID JUST-IN-TIME INTEGRATION," filed Sep. 29, 2010, the entire contents of which are herein incorporated by reference.

FIELD OF THE INVENTION

This invention relates generally to directory server integration, and more specifically, to just-in-time (JIT) directory integration.

BACKGROUND OF THE INVENTION

Today, people and businesses rely on networked computer systems to support distributed applications. As the number of different networks and applications has grown, the number of specialized directories of information has also grown, resulting in islands of information that are difficult to share and manage. If all of this information could be maintained and accessed in a consistent and controlled manner, it would provide a focal point for integrating a distributed environment into a consistent and seamless system. The Lightweight Directory Access Protocol (LDAP) is an open industry standard that has evolved to meet these needs. LDAP is based on the client/server model of distributed computing and defines a standard method for accessing and updating information in a directory. In computer terms, a directory is a specialized database, also called a data repository, that stores typed and ordered information about objects.

LDAP has gained wide acceptance as the directory access method of the Internet and is therefore also becoming strategic within enterprise intranets. It is being supported by a growing number of software vendors and is being incorporated into a growing number of applications. However, current solutions propagate too much data and information too frequently, resulting in unnecessarily large databases and data transfers. Existing directory integration methods fetch data before it is requested. A large batch of data is retrieved from the data sources, while the data in the directory is replaced. Any subsequent changes to the sources are also changed in the directory. Thus, all of the data is propagated because it is not determined what information will be needed by the client in the future.

SUMMARY OF THE INVENTION

In one embodiment, there is a method for just-in-time (JIT) retrieval of directory information. In this embodiment, the method comprises: receiving a request for directory information at a directory server; determining, by the directory server, a location corresponding to a set of current attribute values for responding to the request; and retrieving the set of current attribute values from at least one of the following: the directory server, and an external source.

In a second embodiment, there is a directory apparatus for just-in-time (JIT) retrieval of directory information, the directory apparatus comprising a directory server; memory operably associated with the directory server; a request handler storable in memory and executable by the directory server, the request handler configured to: receive a request from a client at the directory server; determine a location corresponding to a set of current attribute values for responding to the request; retrieve the set of current attribute values from at least one of the following: the directory server, and an external source; and return a set of current attributes to the client from the directory server.

In a third embodiment, there is a computer-readable medium storing computer instructions, which when executed, enables a computer system operating with a directory server to provide just-in-time (JIT) retrieval of directory information. In this embodiment, the computer instructions comprise: receiving a request from a client at the directory server; determining, by the directory server, a location corresponding to a set of current attribute values for responding to the request; and retrieving the set of current attribute values in a JIT manner from at least one of the following: the directory server, and an external source.

In a fourth embodiment, there is a method for deploying an integrating directory for use in a computer system to provide just-in-time (JIT) retrieval of directory information. In this embodiment, a computer infrastructure is provided and is operable to: receive a request from a client at a directory server; determine, by the integrating directory, a location corresponding to a set of current attribute values for responding to the request; retrieve the set of current attribute values in a JIT manner from at least one of the following: the directory server, and an external source; and return a set of current attributes to the client from the directory server.

Figure 1:
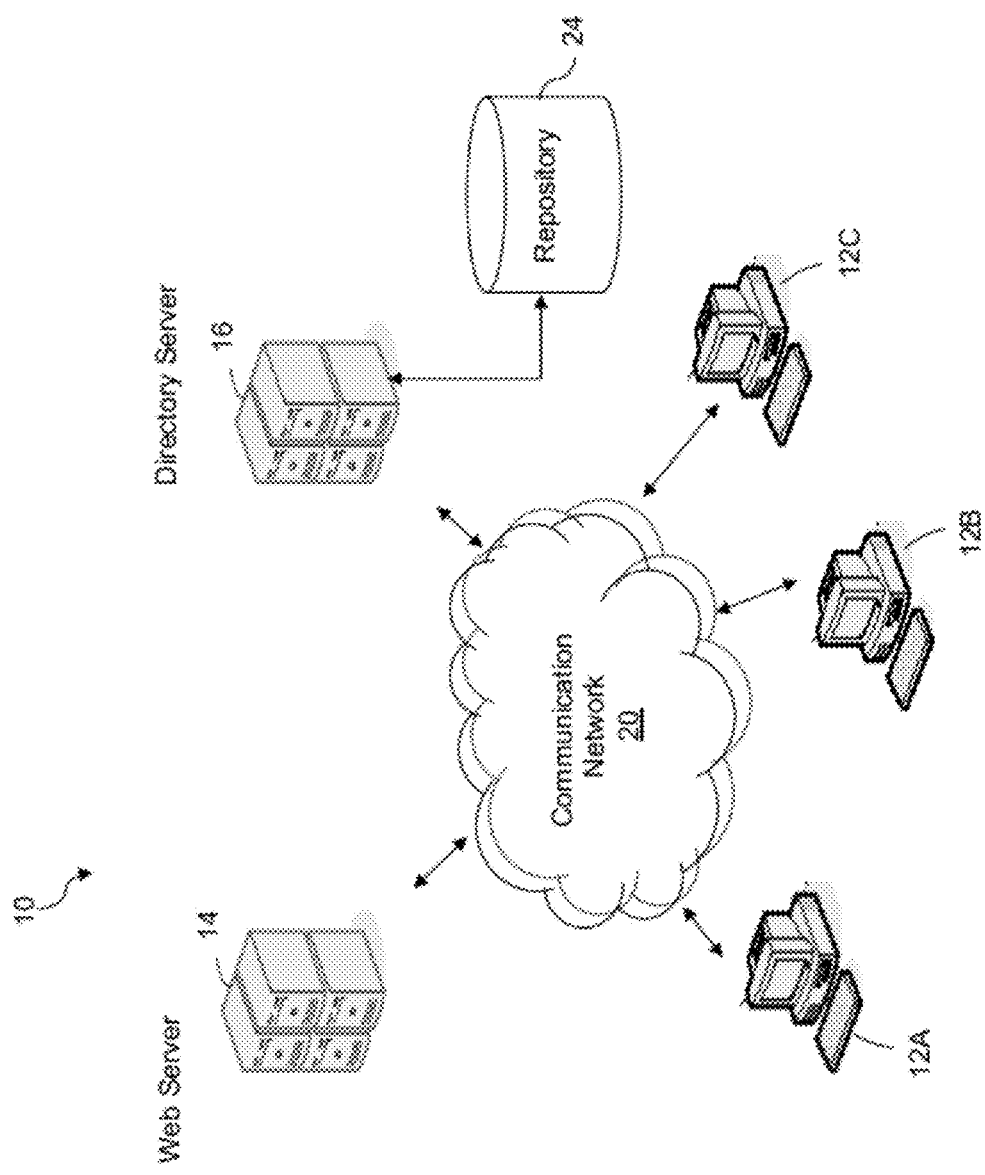
FIG. 1 illustrates network architecture including a communication link between network-connected clients and a directory server according to embodiments of the invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. For example, embodiments of the invention may be described in the context of Lightweight Directory Access Protocol (LDAP). It will be appreciated, however, that the invention applies to virtually any directory interface, including, but not limited to LDAP. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus appearances of the phrases "in one embodiment," "in an embodiment," "in embodiments" and similar language throughout this specification may, but do not necessarily, all refer to the same embodiment.

Embodiments of this invention are directed to just-in-time (JIT) retrieval of directory information to reduce network traffic and load on directory servers and/or data sources by requesting only the information that is currently needed from the directory server. In these embodiments, a request handler operating with the directory server provides this capability. Specifically, the request handler and directory server are configured to receive a request from a client and to determine a location corresponding to a set (i.e., one or more) of current attribute values for responding to the request. The request handler retrieves the set of current attribute values from at least one of the following: the directory server and an external source. A set of current attributes corresponding to the set of current attribute values is returned to the client from the directory server. The request handler propagates information in a JIT manner so that only the information that will be currently used by the client is propagated across the network.

FIG. 1 illustrates network architecture 10 including a communication link between network-connected clients and a directory server (e.g., a LDAP directory server) according to embodiments of this invention. As shown, network architecture 10 may include clients 12A, 12B, 12C coupled with a web server 14 (or a set of web servers) and directory server 16 (or a set of directory servers) via a communication network 20 (e.g., a public network such as the Internet or a private network such as a local area network (LAN)). The client devices 12A, 12B, 12C may be, for example, server devices for Enterprise Service Bus, Policy Decision Points, Policy Enforcement Points, personal computers (PCs), mobile phones, palm-sized computing devices, personal digital assistants (PDAs), etc.

Communication network 20 may be described in a simplified manner as a collection of computer systems (e.g., clients and servers) that are interconnected by transmission lines (or wireless transmissions) and routers/switches to enable the transfer of information among them, as illustrated in FIG. 1. These computer systems are often modeled by their functions: client-server. In the client-server model, communication generally takes the form of a request from the client to the server asking for an operation to be performed (e.g., request for data). The server performs the work and sends a reply. A client may then retrieve and display the requested information. However, a computer system may operate as both a server and a client.

Client-server systems communicate with each other using a variety of network protocols, such as Transmission Control Protocol/Internet Protocol (TCP/IP) and Integrated Packet Exchange (IPX), and a variety of application protocols, such as Hypertext Transfer Protocol (HTTP) and File Transfer Protocol (FTP). A user typically views the network as a collection of web pages that are typically located on a server at a network site. Each web page may contain text, embedded components such as graphic image files, and address links to other pages referred to as a Uniform Resource Locator (URL). Web pages are viewed using a program called a web browser that resides on a user's client device. The web browser retrieves information from a requested page on a server, interprets the data and formatting commands, and displays the text and special accessory files, such as images, on the user's client device. Web pages may be created using Hypertext Markup Language (HTML) with hypertext and other information to be displayed in a web browser.

Directory server 16 operates with a repository 24, which may be a directory of data entries containing LDAP information (e.g., an attribute store), repository 24 being stored in directory server 16. Upon receiving a request for directory information from any of the clients 12A, 12B, 12C, the request is sent to and received directly by directory server 16. Alternatively, web server 14 retrieves data from directory server 16, which in turn retrieves data from its associated repository 24.

LDAP is a networking protocol for querying and modifying directory services running over TCP/IP. Repository 24 may contain a tree of data entries, each of which comprises a collection of attributes that contain information about an object. Every attribute has a type and one or more values. The type of the attribute is associated with the syntax, which specifies the kind of values the can be stored (e.g., cn (common name), sn (surname), givenName, mail, uid, and userPassword). Schemas define the type of objects that can be stored in the directory. Schemas also list the attributes of each object type and whether these attributes are required or optional. Repository 24 may be any type of recordable media including but not limited to DASD (direct access storage device), floppy disk, CD ROM, DVD, semiconductor memory, or magnetic tape along with a drive or other apparatus for accessing data in the directory entries. Repository 24 may be either rewritable media, or read-only. If read-only then the directory entries have to be placed on the media by some process other than use of the drive or apparatus used for access.

Attributes within repository 24 will often have different names and syntaxes in source and target systems. Some attribute values for a target system don't have a direct mapping and may have to be computed from values in one or more source systems, for example, as when first name, middle initial, and last name in a system are combined to create a cn (common name) attribute in repository 24. However, attribute mapping rules can be much more complex. For example, the users in LDAP repositories can be organized into a hierarchical directory tree with a distinguished name (DN) that specifies the precise location of their entry in the tree. When groups are synchronized between directories with different tree structures the groups contain the DNs of users in a member attribute. The DNs have to be mapped between the tree structures as the group entries are copied or synchronized between the directories. As discussed in further detail below, repository 24 maintains both internal values and attribute values from other sources (e.g., external sources), as well as information on how to retrieve these external values, how long they can be used, and how to select between the values when similar and/or multiple values exist.

Figure 2:
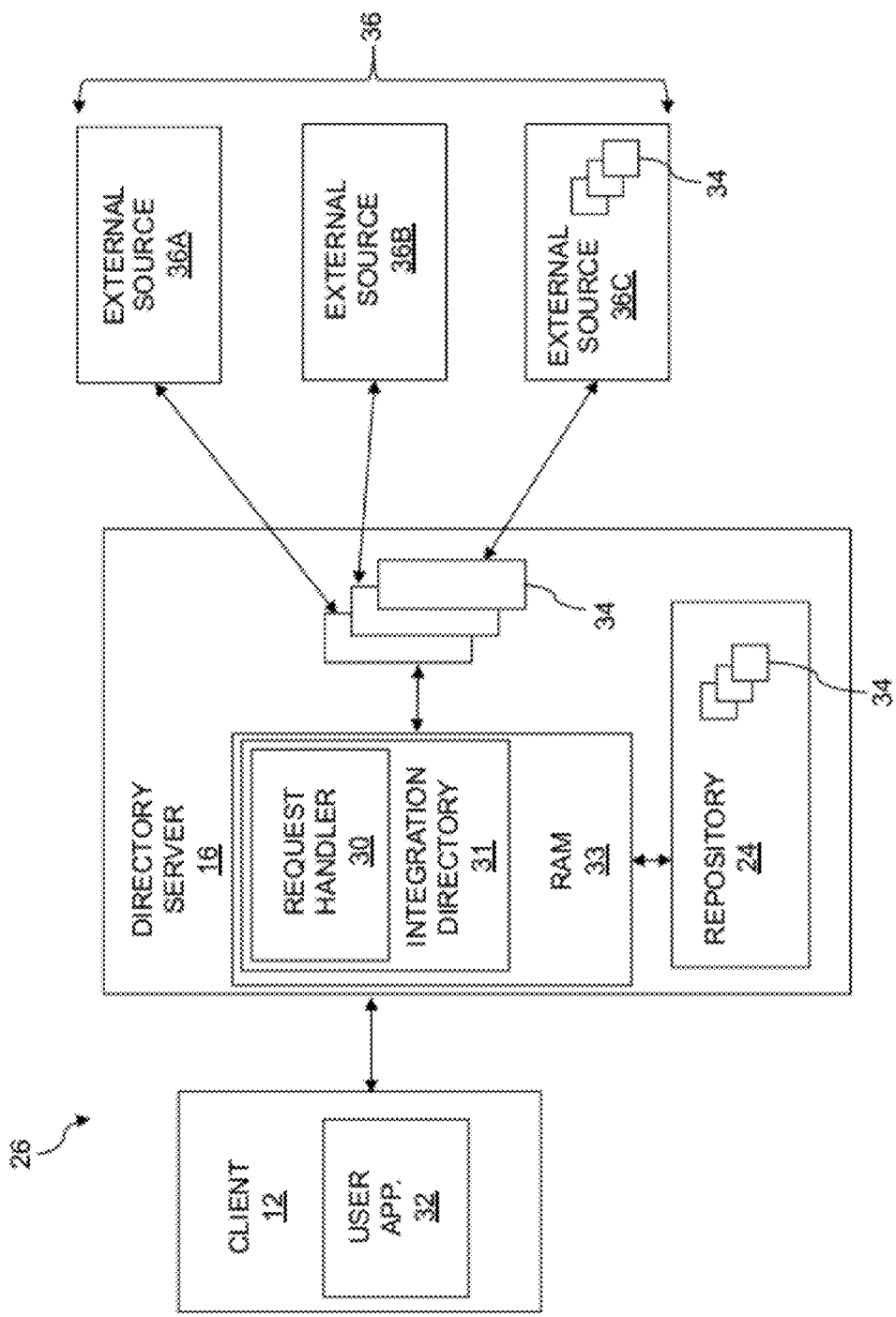
FIG. 2 shows a more detailed view of a directory apparatus for just-in-time (JIT) retrieval of directory information that operates in the environment shown in FIG. 1 according to embodiments of the invention.

Referring now to FIG. 2, a directory apparatus 26 for JIT retrieval of directory information (i.e., LDAP data) that operates in the environment shown in FIG. 1 is described in more detail. Directory apparatus 26 comprises directory server 16 and repository 24 operating with a user application 32 (e.g., any software application having a need for directory data such as directory entries on repository 24) on client 12. As shown, directory server 16 includes an integrating directory 31 (e.g., software code, program module, application program, etc.) stored in random access memory (RAM) 33. Integrating directory 31 synchronizes identity data residing in directories, databases, applications, and external sources. Integrating directory 31 includes transposable components that support connectivity to a variety of data stores, provide protocols for the reliable and secure transportation of data between them, and help automate the mapping of data between them.

In one embodiment, integrating directory 31 includes one or more request handlers 30 to help system integrators automate data flow between data stores in near real-time as data is changed or based on defined schedules. Integrating directory 31 and request handler 30 comprise software or computer readable programming that accepts directory requests and retrieves information in a JIT manner from repository 24. In a preferred embodiment, request handler 30 is a component of integrating directory 31, and adds the JIT integration functionality to integrating directory 31 and directory server 16. During operation, request handler 30 is inactive until a request is received from client 12. Request handler 30 integrates in a JIT manner, i.e., only when a request is made, so that only the data requested is fetched.

Figure 3:
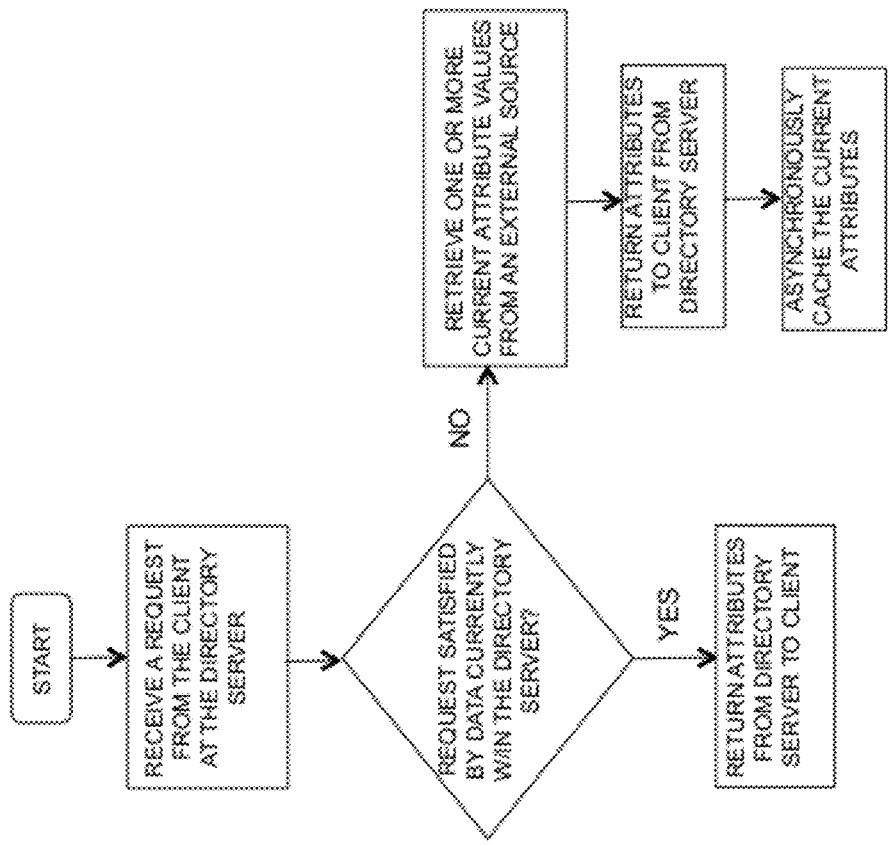
FIG. 3 shows a diagram of a method for just-in-time (JIT) retrieval of directory information according to embodiments of the invention.

During operation, as shown in FIGS. 2-3, user application 32 sends a query or request from client 12 across a path, which is received at directory server 16. Request handler 30, operating with directory server 16, is configured to determine a location corresponding to a set of current attribute values 34 for responding to the request. The location of current attribute values 34, shown here within directory server 16 and an external source 36C for exemplary purposes only, depends on whether the request can be satisfied by data currently within directory server 16. As used herein, a current attribute value is an attribute value that has been updated within a determined period of time to assure that the information is sufficiently up-to-date. Once the location is determined, set of current attribute values 34 is retrieved (asynchronously or synchronously) in a JIT manner from at least one of the following: directory server 16, and an external source 36 (e.g., an LDAP provider). If the request can be satisfied by data currently within directory server 16, then the current attribute value(s) is returned to client 12 from directory server 16, thus reducing network traffic and load on external sources 36. However, in the case that the request cannot be satisfied by data currently within directory server 16 (e.g., an attribute value is stale), at least one of set of current attribute values 34 is located and asynchronously retrieved from external sources 36A, 36B, and/or 36C.

Figure 4:
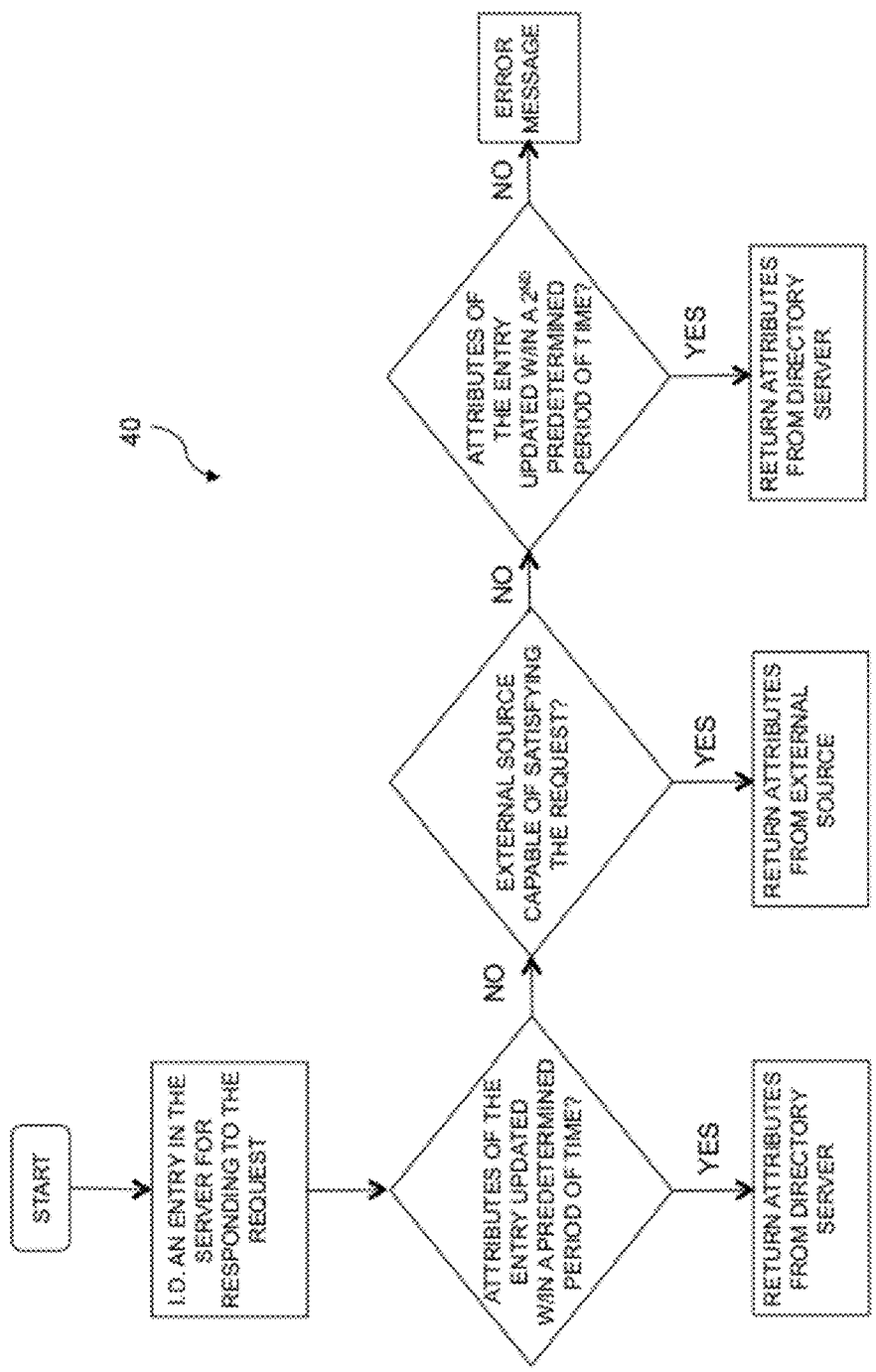
FIG. 4 shows a diagram of a method for determining whether a client request can be satisfied by data currently within the directory server according to embodiments of the invention.

As discussed above, upon receiving a request from client 12, directory server 16 attempts to first retrieve the attributes internally. Request handler 30 of integration directory 31 determines whether the request can be satisfied by data currently within directory server 16, as shown in the process flow 40 of FIG. 4. Initially, an entry in directory server 16 is identified for responding to the request. If the entry is found, request handler 30 determines whether one or more attributes of the entry in directory server 16 have been updated within a predetermined period of time. To accomplish this, a refresh/date cached value stored in request handler 30 for the attribute values is checked against a predetermined refresh date to determine if the data is stale and must be refreshed. If the data must be refreshed, the request from client 12 is not capable of being satisfied solely by directory server 16, and data needs to come from an external source 36. Request handler 30 maps (i.e., determines) the location corresponding to set of current attributes 34 for responding to the request from one or more external sources 36A, 36B, or 36C. To accomplish this, request handler 30 operates with one or more integration tools 38, which are configured to connect with external sources 36 and to perform actions on data appropriately. Each integration tool 38 is linked to one or more data sources and provides an environment specific to that type of source so that data transformations and aggregation operations are easy to configure.

Next, it is determined whether external sources 36 is able to satisfy the request in the case that directory server 16 has not been updated within the predetermined period of time. If external source 36 is unable to satisfy the request (i.e., the location cannot be mapped), request handler 30 determines whether the one or more attributes of the entry in directory server 16 have been updated within a second predetermined period of time. For example, if the identity (i.e., distinguished name) cannot be mapped, then the refresh/date cached value stored in request handler 30 for the attributes is again checked against a second, typically less preferable predetermined refresh date to determine if the values in repository 24 may still be used. If the attribute values are acceptable, the request is passed on to directory server 16. However, if the attribute values are not current within the first or second predetermined periods of time, and external sources 36A-36C are unavailable, then the request cannot be satisfied, and an error message is returned to client 12. In another embodiment, request handler 30 may determine that the attribute values may still be returned even if stale beyond the first and second predetermined periods of time. In yet another embodiment, repository 24 may be pre-loaded if the identity cannot be mapped by request handler 30.

Once current attribute values 34 are located, and the corresponding current attributes are returned from directory server 16 to client 12, request handler 30 asynchronously caches set of current attribute values 34 in repository 24 and updates a refresh value for each of set of current attribute values 34. The refresh value represents the date and time that the attribute values were cached in repository 24, as well as how long they can be used before becoming stale. The refresh and staleness limits may be specified by an administrator. Caching the attributes in repository 24 reduces network traffic and load on external sources 36, and provides a redundant source in case any of external sources 36 fail.

Figure 5:
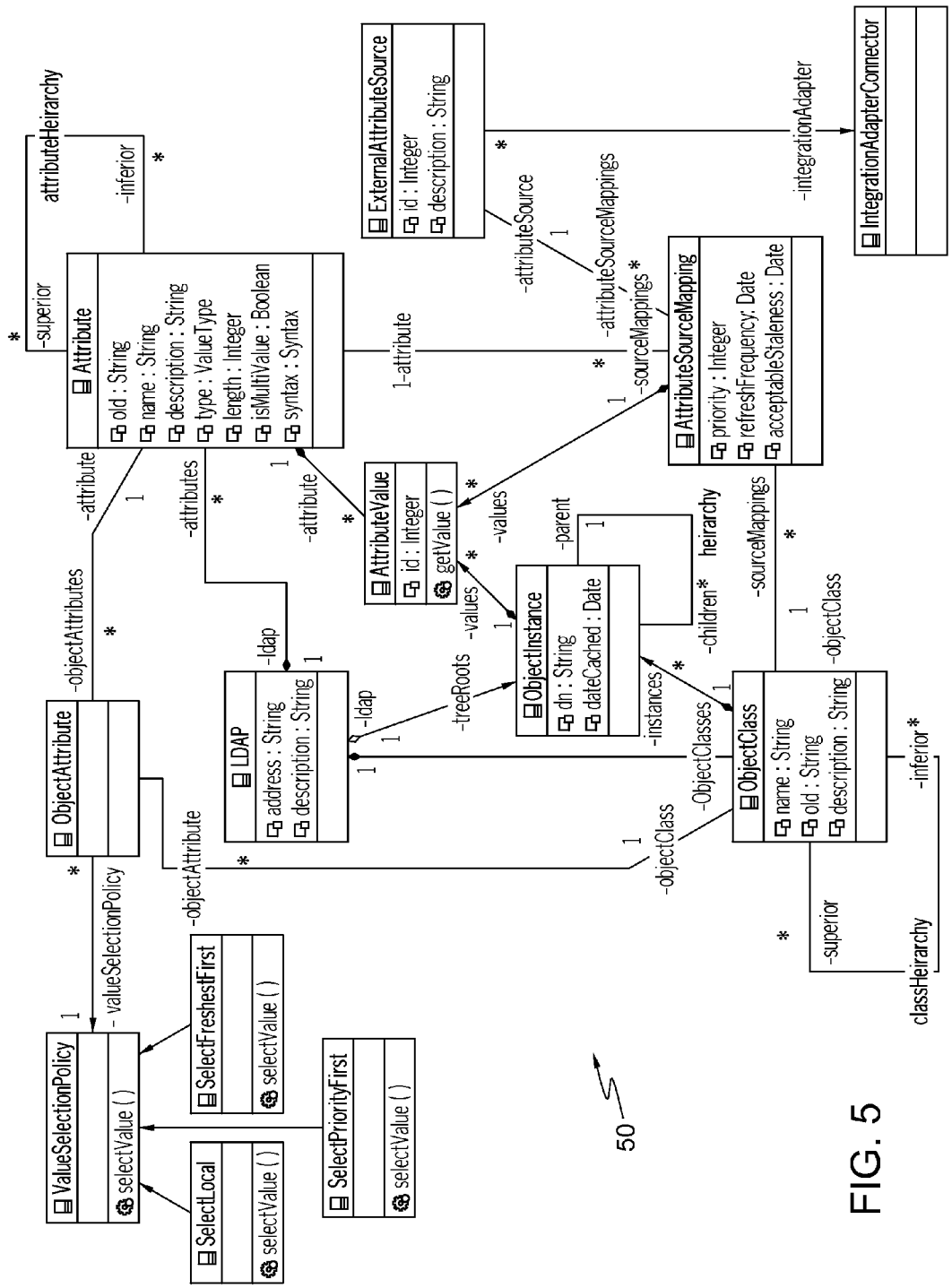
FIG. 5 shows a structure for mapping attribute sources according to an embodiment of the invention.

As discussed above, repository 24 maintains both internal attribute values and attribute values from external sources, as well as information on how to retrieve these external values, how long they can be used, and how to select between the values when similar and/or multiple values exist. Referring now to FIG. 5, a structure 50 for mapping attribute sources according to embodiments of the invention will be described in greater detail. Initially, request handler 30 (FIG. 2) checks to see if there are instance records in the CacheHistory for the requested instance, which is queried by DN. If records are found, structure 50 finds corresponding AttributeSourceMapping for each CacheHistory. Next, structure 50 evaluates whether AttributeSourceMapping.refreshFrequency+CacheHistory.dateCached<SYSTEMDATE. If the expression evaluates to true, then the data is not stale and may be used. If the expression evaluates to false, the data is stale and should be refreshed. Structure 50 then compares the names (or OIDs) in the incoming request to the names (or OIDs) in the corresponding Attribute (via AttributeSet). Structure 50 returns all of the names (or OIDs) of attributes that are not stale and in the list of attributes to be requested.

If some of the data is not current, structure 50 checks to see if there are instance records in the CacheHistory for the requested instance (queried by DN). If records are found, structure 50 finds corresponding AttributeSourceMapping for each CacheHistory and evaluates whether the AttributeSourceMapping.refreshFrequency+CacheHistory.dateCached<SYSTEMDATE. If the expression evaluates to true, then the data is not stale and may be used. If the expression evaluates to false, the data is stale and should be refreshed. Structure 50 then compare the names (or OIDs) in the incoming request to the names (or OIDs) in the corresponding Attribute (via AttributeSet). Structure 50 returns AttributeMaps for all of the names and locations (or OIDs) of attributes that are stale and in the list of attributes to be requested. These AttributeMaps represent a set of attributes that must be retrieved from a remote system (e.g., an external source). The AttributeMaps have a remote address and multiple attributes, including the key to retrieve the values. The AttributeMap represents a set of attributes that must be retrieved from a remote system. The AttributeMap has an ExternalAttributeSource (integration interface of the system from which to retrieve the data) and multiple attributes (including the key to retrieve the values). When the AttributeMap.updateRefreshDatesAndValues method is invoked, the AttributeMap updates the corresponding ObjectInstance.dateCached with the System Date and the AttributeValue with the refreshed value.

In the case that multiple attributes from set of current attribute values 34 are available to satisfy a request, request handler 30 is configured to select a preferred current attribute value(s). Because an Attribute's value may be retrieved from multiple sources, multiple values may exist in the AttributeStore for each Attribute. As shown in FIG. 5, ValueSelectionPolicy is the component that determines for an ObjectInstance which AttributeValues to return for a given Attribute. The ValueSelectionPolicy makes the decision on the best one or none of them. The ValueSelectionPolicy is selected through the ObjectAttribute so that each combination of ObjectClass and Attribute can have a different ValueSelectionPolicy. The configuration of which ValueSelectionPolicy to use for each combination is made by the directory administrator. Each ValueSelectionPolicy will take into consideration dates, sources, and other data in ranking and selecting an AttributeValue. The algorithm for the selection is determined by the authors of the ValueSelectionPolicys, e.g., anyone with administrative privileges.

After the current attribute values are located and subsequently returned to the directory server, structure 50 invokes an AttributeMap.updateRefreshDates method, which updates the corresponding CacheHistory with a date determined by request handler 30. Request handler 30 updates the data in repository 24 via directory server 16.

In still another embodiment, the methodologies disclosed herein can be used within a computer system to provide JIT propagation of directory information. In this case, one or more systems for performing the processes described in the invention can be obtained and deployed to a computer infrastructure. To this extent, the deployment can comprise one or more of (1) installing program code on a computing device, such as a computer system, from a computer-readable medium (e.g., a transitory computer-readable medium, or a non-transitory computer readable medium); (2) adding one or more computing devices to the infrastructure; and (3) incorporating and/or modifying one or more existing systems of the infrastructure to enable the infrastructure to perform the process actions of the invention.

Figure 6:
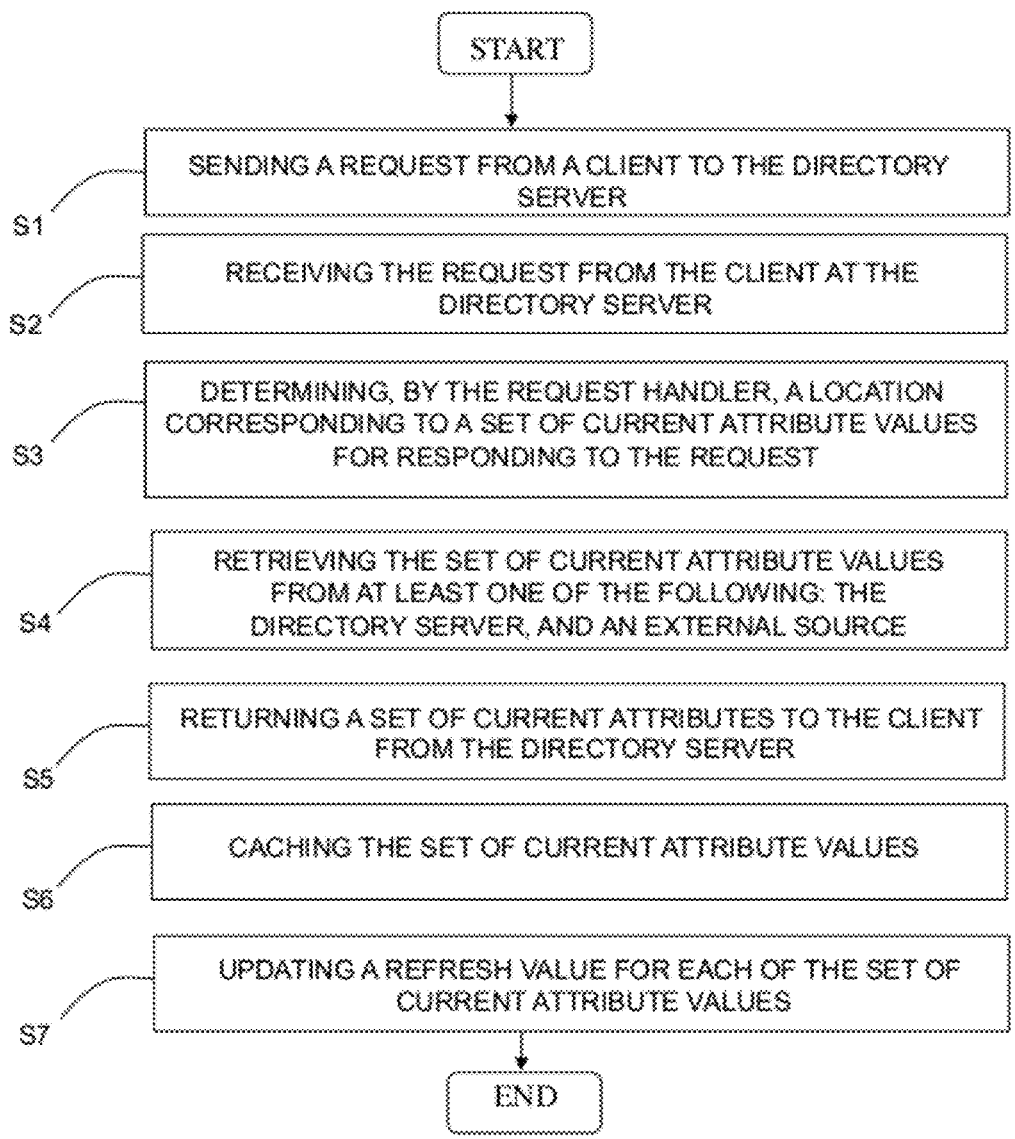
FIG. 6 shows a diagram of a method for retrieving directory information in a JIT manner according to embodiments of the invention.

Furthermore, one or more program modules may carry out the methodologies disclosed herein, as shown in FIG. 6. According to one embodiment, in step S1, a request for directory information is sent to the directory server and received at the directory server in S2. In S3, the location corresponding to a set of current attribute values for responding to the request is determined by the request handler. In S4, the set of current attribute values is retrieved from at least one of the following: the directory server, and an external source. In S5, a set of current attributes is returned to the client from the directory server. In S6, the set of current attribute values is asynchronously cached. In S7, a refresh value for each of the set of current attribute values is updated. The flowchart of FIG. 6 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

An implementation of a computer for carrying out the invention may be stored on or transmitted across some form of computer readable media. Computer readable media can be any available media that can be accessed by a computer. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for JIT retrieval of directory information. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for just-in-time (JIT) retrieval of directory information, the method comprising:
   receiving a request for directory information at a directory server;
   determining, by the directory server, a location corresponding to a set of current attribute values for responding to the request, the determining comprising:
   retrieving internal attributes and external attributes of a set of attributes from the directory server, wherein the directory server continuously maintains the retrieved external attributes as a duplicate source in the case that an external source associated with one or more of the external attributes is no longer capable of being mapped to, and wherein the retrieved external attributes continuously maintained as the duplicate source include lightweight directory access protocol information about an object, each of the external attributes having an attribute type associated with a syntax that defines the kind of values that can be stored in the directory server;
   determining whether internal data corresponding to the set of attributes from the directory server is current by evaluating whether the internal data has been refreshed in the directory within a first predetermined period of time;
   in the case that the internal data has been refreshed in the directory within the first predetermined period of time, determining, based on the evaluation, the repository as the location corresponding to the set of current attribute values;
   in the case that the internal data in the repository has not been refreshed within the first predetermined period of time, determining whether data corresponding to the set of attributes previously retrieved from an external source and cached in the directory server is current and determining the external source as the location corresponding to the set of attribute values, based on the determination that the data corresponding to the set of attributes previously retrieved from the external source and cached in the directory server is current, wherein the determining is performed prior to a subsequent retrieval from the external source for data corresponding to the set of attributes, and wherein, as a result of the determining, the subsequent retrieval from the external source is not performed in the case that data corresponding to the set of attributes previously retrieved from the external source and cached in the directory server is current; and
   in the case that the data corresponding to the set of attributes previously retrieved from an external source and cached in the directory server is not current, determining whether the internal data in the directory has been refreshed with a second predetermined period of time, and determining the directory as the location corresponding to the set of attribute values, based on the determination that the internal data in the directory has been refreshed within the second predetermined period of time;
   retrieving the set of current attribute values from the directory server in the case that the data corresponding to the set of attributes from the directory server is current, and from the external source in the case that the data corresponding to the set of attributes from the directory server is not current; and
   updating the directory by caching the set of attribute values in the directory and associating a refresh date with the set of attribute values, in the case that the set of attribute values is retrieved from the external source.

2. The method according to claim 1, further comprising:
   returning a set of current attributes to the client from the directory server;
   asynchronously caching the set of current attribute values in a repository; and
   updating a refresh value for each of the set of current attribute values.

3. The method according to claim 1, wherein the determining comprises:
   determining, by the directory server, whether the request can be satisfied by data currently within the directory server; and
   locating at least one of the set of current attribute values from within the external source in the case that the request cannot be satisfied by data currently within the directory server.

4. The method according to claim 3, wherein the determining, by the directory server, whether the request can be satisfied by data currently within the directory server comprises:
   identifying an entry in the directory server for responding to the request; and
   determining whether one or more attributes of the entry in the directory server have been updated within a predetermined period of time.

5. The method according to claim 4, further comprising:
   determining whether the external source is able to satisfy the request in the case that the one or more attributes of the entry in the directory server have not been updated within the predetermined period of time; and determining whether the one or more attributes of the entry in the directory server have been updated within a second predetermined period of time in the case that the external source is unable to satisfy the request.

6. The method according to claim 1, further comprising selecting a preferred current attribute value from the set of current attribute values.

7. A directory apparatus for just-in-time (JIT) retrieval of directory information, comprising:
a directory server;
memory operably associated with the directory server; and
a request handler storable in memory and executable by the directory server, the request handler configured to:
receive a request from a client;
determine a location corresponding to a set of current attribute values for responding to the request by performing the following:
retrieve internal attributes and external attributes of a set of attributes from the directory server, wherein the directory server continuously maintains the retrieved external attributes as a duplicate source in the case that an external source associated with one or more of the external attributes is no longer capable of being mapped to, and wherein the retrieved external attributes continuously maintained as the duplicate source include lightweight directory access protocol information about an object, each of the external attributes having an attribute type associated with a syntax that defines the kind of values that can be stored in the directory server;
determine whether internal data corresponding to the set of attributes from the directory server is current by evaluating whether the internal data has been refreshed in the directory within a first predetermined period of time;
in the case that the internal data has been refreshed in the directory within the first predetermined period of time, determine, based on the evaluation, the repository as the location corresponding to the set of current attribute values;
in the case that the internal data in the repository has not been refreshed within the first predetermined period of time, determine whether data corresponding to the set of attributes previously retrieved from an external source and cached in the directory server is current and determine the external source as the location corresponding to the set of attribute values, based on the determination that the data corresponding to the set of attributes previously retrieved from the external source and cached in the directory server is current, wherein the determining is performed prior to a subsequent retrieval from the external source for data corresponding to the set of attributes, and wherein, as a result of the determining, the subsequent retrieval from the external source is not performed in the case that data corresponding to the set of attributes previously retrieved from the external source and cached in the directory server is current; and
in the case that the data corresponding to the set of attributes previously retrieved from an external source and cached in the directory server is not current, determine whether the internal data in the directory has been refreshed with a second predetermined period of time, and determine the directory as the location corresponding to the set of attribute values, based on the determination that the internal data in the directory has been refreshed within the second predetermined period of time;
retrieve the set of current attribute values from the directory server in the case that the data corresponding to the set of attributes from the directory server is current, and from the external source in the case that the data corresponding to the set of attributes from the directory server is not current;
update the directory by caching the set of attribute values in the directory and associating a refresh date with the set of attribute values, in the case that the set of attribute values is retrieved from the external source; and
return a set of current attributes to the client from the directory server.

8. The directory apparatus according to claim 7, the request handler further configured to:
asynchronously cache the set of current attribute values; and
update a refresh value for each of the set of current attribute values.

9. The directory apparatus according to claim 7, wherein the request handler configured to determine is further configured to:
determine whether the request can be satisfied by data currently within the directory server; and
locate at least one of the set of current attribute values from within the external source in the case that the request cannot be satisfied by data currently within the directory server.

10. The directory apparatus according to claim 9, wherein the request handler configured to determine whether the request can be satisfied by data currently within the directory server is further configured to:
identify an entry in the directory server for responding to the request; and
determine whether one or more attributes of the entry in the directory server have been updated within a predetermined period of time.

11. The directory apparatus according to claim 10, the request handler further configured to:
determine whether the external source is able to satisfy the request in the case that the one or more attributes of the entry in the directory server have not been updated within the predetermined period of time; and
determine whether the one or more attributes of the entry in the directory server have been updated within a second predetermined period of time in the case that the external source is unable to satisfy the request.

12. The directory apparatus according to claim 7, the request handler further configured to select a preferred current attribute value from the set of current attribute values.

13. A computer-readable storage medium storing computer instructions, which when executed, enables a computer system operating with a directory server to provide just-in-time (JIT) retrieval of directory information, the computer instructions comprising:
receiving a request from a client at the directory server;

determining, by the directory server, a location corresponding to a set of current attribute values for responding to the request, the determining comprising:
retrieving internal attributes and external attributes of a set of attributes from the directory server, wherein the directory server continuously maintains the retrieved external attributes as a duplicate source in the case that an external source associated with one or more of the external attributes is no longer capable of being mapped to, and wherein the retrieved external attributes continuously maintained as the duplicate source include lightweight directory access protocol information about an object, each of the external attributes having an attribute type associated with a syntax that defines the kind of values that can be stored in the directory server;
determining whether internal data corresponding to the set of attributes from the directory server is current by evaluating whether the internal data has been refreshed in the directory within a first predetermined period of time;
in the case that the internal data has been refreshed in the directory within the first predetermined period of time, determining, based on the evaluation, the repository as the location corresponding to the set of current attribute values;
in the case that the internal data in the repository has not been refreshed within the first predetermined period of time, determining whether data corresponding to the set of attributes previously retrieved from an external source and cached in the directory server is current and determining the external source as the location corresponding to the set of attribute values, based on the determination that the data corresponding to the set of attributes previously retrieved from the external source and cached in the directory server is current, wherein the determining is performed prior to a subsequent retrieval from the external source for data corresponding to the set of attributes, and wherein, as a result of the determining, the subsequent retrieval from the external source is not performed in the case that data corresponding to the set of attributes previously retrieved from the external source and cached in the directory server is current; and
in the case that the data corresponding to the set of attributes previously retrieved from an external source and cached in the directory server is not current, determining whether the internal data in the directory has been refreshed with a second predetermined period of time, and determining the directory as the location corresponding to the set of attribute values, based on the determination that the internal data in the directory has been refreshed within the second predetermined period of time;
retrieving the set of current attribute values from the directory server in the case that the data corresponding to the set of attributes from the directory server is current, and from the external source in the case that the data corresponding to the set of attributes from the directory server is not current; and
updating the directory by caching the set of attribute values in the directory and associating a refresh date with the set of attribute values, in the case that the set of attribute values is retrieved from the external source.

14. The computer-readable storage medium according to claim 13, further comprising computer instructions for:
returning a set of current attributes to the client from the directory server;
asynchronously caching the set of current attribute values in a repository; and
updating a refresh value for each of the set of current attribute values.

15. The computer-readable storage medium according to claim 13, the computer instructions for determining comprising:
determining, by the directory server, whether the request can be satisfied by data currently within the directory server; and
locating at least one of the set of current attribute values from within the external source in the case that the request cannot be satisfied by data currently within the directory server.

16. The computer-readable storage medium according to claim 15, the computer instructions for determining, by the directory server, whether the request can be satisfied by data currently within the directory server comprising:
identifying an entry in the directory server for responding to the request; and
determining whether one or more attributes of the entry in the directory server have been updated within a predetermined period of time.

17. The computer readable storage medium according to claim 16, further comprising computer instructions for:
determining whether the external source is able to satisfy the request in the case that the one or more attributes of the entry in the directory server have not been updated within the predetermined period of time; and
determining whether the one or more attributes of the entry in the directory server have been updated within a second predetermined period of time in the case that the external source is unable to satisfy the request.

18. The computer-readable storage medium according to claim 13, further comprising computer instructions for selecting a preferred current attribute value from the set of current attribute values.

19. A method for deploying an integration directory for use in a computer system to provide just-in-time (JIT) retrieval of directory information, comprising:
providing a computer infrastructure operable to:
receive a request from a client at a directory server;
determine, by the integration directory, a location corresponding to a set of current attribute values for responding to the request by:
retrieving internal attributes and external attributes of a set of attributes from the directory server, wherein the directory server continuously maintains the retrieved external attributes as a duplicate source in the case that an external source associated with one or more of the external attributes is no longer capable of being mapped to, and wherein the retrieved external attributes continuously maintained as the duplicate source include lightweight directory access protocol information about an object, each of the external attributes having an attribute type associated with a syntax that defines the kind of values that can be stored in the directory server;
determining whether internal data corresponding to the set of attributes from the directory server is current by evaluating whether the internal data has been refreshed in the directory within a first predetermined period of time;

in the case that the internal data has been refreshed in the directory within the first predetermined period of time, determining, based on the evaluation, the repository as the location corresponding to the set of current attribute values;

in the case that the internal data in the repository has not been refreshed within the first predetermined period of time, determining whether data corresponding to the set of attributes previously retrieved from an external source and cached in the directory server is current and determining the external source as the location corresponding to the set of attribute values, based on the determination that the data corresponding to the set of attributes previously retrieved from the external source and cached in the directory server is current, wherein the determining is performed prior to a subsequent retrieval from the external source for data corresponding to the set of attributes, and wherein, as a result of the determining, the subsequent retrieval from the external source is not performed in the case that data corresponding to the set of attributes previously retrieved from the external source and cached in the directory server is current; and in the case that the data corresponding to the set of attributes previously retrieved from an external source and cached in the directory server is not current, determining whether the internal data in the directory has been refreshed with a second predetermined period of time, and determining the directory as the location corresponding to the set of attribute values, based on the determination that the internal data in the directory has been refreshed within the second predetermined period of time;

retrieving, in a JIT manner, the set of current attribute values from the directory server in the case that the data corresponding to the set of attributes from the directory server is current, and from the external source in the case that the data corresponding to the set of attributes from the directory server is not current;

updating the directory by caching the set of attribute values in the directory and associating a refresh date with the set of attribute values, in the case that the set of attribute values is retrieved from the external source; and returning the set of current attributes to the client from the directory server.

20. The method according to claim 19, the computer infrastructure further operable to:
   asynchronously cache the set of current attribute values; and
   update a refresh value for each of the set of current attribute values.

21. The method according to claim 19, the computer infrastructure operable to determine further operable to:
   determine whether the request can be satisfied by data currently within the directory server; and
   locate at least one of the set of current attribute values from the external source in the case that the request cannot be satisfied by data currently within the directory server.

22. The method according to claim 21, the computer infrastructure operable to determine whether the request can be satisfied by data currently within the directory server further operable to:
   identify an entry in the directory server for responding to the request;
   determine whether one or more attributes of the entry in the directory server have been updated within a predetermined period of time;
   determine whether the external source is able to satisfy the request in the case that the one or more attributes of the entry in the directory server have not been updated within the predetermined period of time; and
   determine whether the one or more attributes of the entry in the directory server have been updated within a second predetermined period of time in the case that the external source is unable to satisfy the request.

* * * * *